(No Model.)
I. BRUCKS.
SUSPENDERS.
No. 433,717. Patented Aug. 5, 1890.
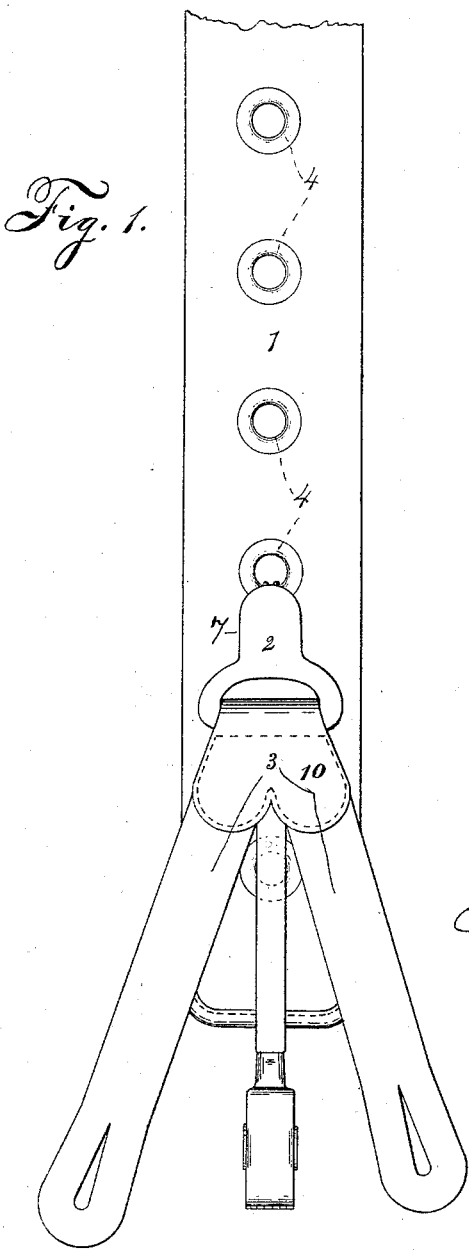
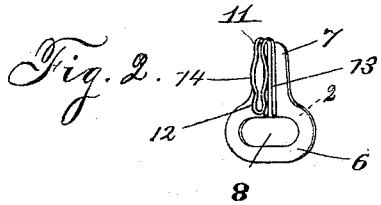
WITNESSES:
Wm B. McArthur
John Hanna
INVENTOR
Isidor Brucks.
BY
Wm. D. Hamilton
ATTORNEY.

UNITED STATES PATENT OFFICE.

ISIDOR BRUCKS, OF LINCOLN, NEBRASKA.

SUSPENDERS.

SPECIFICATION forming part of Letters Patent No. 433,717, dated August 5, 1890.

Application filed April 26, 1890. Serial No. 349,678. (No model.)

*To all whom it may concern:*

Be it known that I, ISIDOR BRUCKS, a citizen of the United States, residing at Lincoln, in the county of Lancaster and State of Nebraska, have invented certain new and useful Improvements in Suspenders, of which the following is a specification.

My invention relates to improvements in suspenders.

The object of my invention is to provide improved means for connecting and holding the suspender-ends to the suspender, the improvement being hereinafter specified in detail, and particularly pointed out in the claim.

I have fully and clearly illustrated my improvements in the accompanying drawings, wherein—

Figure 1 is a view showing my improved hook-connections applied to a suspender provided with eyelets to receive the hook. Fig. 2 is a detail view of the hook.

Reference being had to the drawings, 1 designates the suspender, provided with a number of eyelets to receive the hook 2, attached to the suspender-ends 3. The hook 2 is designed to be hooked in such one of the eyelets 4 as may give the desired adjustment to the suspenders, and is constructed as follows: A plate 6 is provided at its lower end with a transverse loop 8 for the reception of the binding 10, that unites the upper ends of the suspender-ends in pairs, and thereby the latter are attached to said plate. A vertical arm 7, forming an integral part of the plate, extends upward from the loop 8, and the hook 11 is received in the front side of said vertical arm. The said hook 11 is made of a single piece of wire doubled to form a loop 12 at one end and then doubled in to form the parallel arms 13, which are soldered to the face of the arm 7. The depending loop 12 is adapted to enter the eyelets 4, to attach the suspender-ends to the straps, and the said loop has its sides bent outward, as at 14, to form a swell or enlargement, constituting a spring which is of use in retaining the hook-loop in engagement with the eyelets.

Having thus described my invention, I claim as new and desire to secure by Letters Patent—

The suspenders comprising the straps 1, having the eyelets 4, the suspender-ends 3, having the binding 10, uniting their upper ends, and the hook 2, attached to said suspender-ends, the said hook comprising the plate 6, having the loop 8 for the binding and the vertical arm 7, and the looped wire 11, having the parallel arms 13 soldered to the inner face of arm 7, and the downward-extending hook-loop 12 to engage the eyelets, the sides of the hook-loop being bent outward to form the spring 14, for the purposes set forth.

In witness whereof I hereunto affix my signature in the presence of two witnesses.

ISIDOR BRUCKS.

Witnesses:
S. F. MOUCK,
C. N. CRANDALL.